United States Patent [19]

Akkapeddi

[11] Patent Number: 4,949,056

[45] Date of Patent: Aug. 14, 1990

[54] UNCONVENTIONAL ADAPTIVE OPTICS

[75] Inventor: Prasad R. Akkapeddi, Norwalk, Conn.

[73] Assignee: The Perkin-Elmer Corporation, Norwalk, Conn.

[21] Appl. No.: 759,729

[22] Filed: Jul. 29, 1985

[51] Int. Cl.$^5$ .......................... H01S 3/00; H03F 7/00; H04B 9/00
[52] U.S. Cl. ...................................... 330/4.3; 307/426; 350/354; 350/393; 455/601; 455/605; 455/611; 455/615; 455/618
[58] Field of Search ............... 332/7.51; 455/601, 605, 455/611, 615, 618; 307/426; 350/393, 354

[56] References Cited

U.S. PATENT DOCUMENTS 4,215,936  8/1980  Winocur ............................ 455/611
4,233,571 11/1980  Wang et al. ....................... 332/7.51

OTHER PUBLICATIONS

P. J. Klass, Aviation WK & Space Tech., Aug. 24, 1981, p. 61.
V. V. Shkunov et al., Sci. Am., Dec. 1985, p. 54.

*Primary Examiner*—Stephen C. Buczinski
*Attorney, Agent, or Firm*—Thomas P. Murphy; Edwin T. Grimes

[57] ABSTRACT

An improved adaptive optics system is disclosed for correcting atmospheric phase aberrations. A satellite (10) laser beacon is operated at the Stokes shifted Raman wavelength. After passing through the atmosphere (A), the signal is phase conjugated (16) and amplified in the Raman amplifier (12). The result is a high energy laser beam with phase conjugated aberrations which may be returned to the satellite (10).

13 Claims, 1 Drawing Sheet

UNCONVENTIONAL ADAPTIVE OPTICS

TECHNICAL FIELD

This invention relates to adaptive optics especially suited for contacting an orbiting satellite with a ground-based laser

BACKGROUND ART

A common problem in directing a high energy laser beam toward an orbiting satellite and in establishing an optical communications link with a satellite arises from perturbations in the atmosphere which create phase aberrations in the transmitted signal. One technique for dealing with this problem employs a thin deformable mirror having a high density of actuators connected to shape the mirror's surface. An optical signal from the satellite, after passing through the atmosphere, is received by a wavefront sensor which "sees" the phase perturbations in the optical signal caused by the atmosphere. The sensor, in turn, controls the mirror actuators which deform the mirror to compensate for the aberrations. The reflected, corrected low intensity signal from the mirror is amplified by a Raman amplifier and returned to the satellite by a telescope. If desired, information may be encoded on the Raman wavelength ($\lambda_R$) and a modulated signal returned.

The prior art optical link described above, including means for physically deforming a mirror, imposes a substantial time delay on the round trap radiation path. Thus, a satellite traveling at the speed required to sustain orbit will travel a substantial distance between the time a light signal leaves and is returned to it. However, it is important that the signal traverse the same atmospheric path from the satellite to the ground station as from the ground station to the satellite, in order for the aberration corrections to be most effective. One method of overcoming this problem has been to employ a beacon positioned in advance of the satellite to transmit the ground directed signal. This signal may originate at a laser within the beacon or be reflected off it from a ground-based laser. The distance between the beacon and the satellite is such that the signal returned by the ground station along the same path is intercepted by the satellite, which has moved into the position formerly occupied by the beacon. Different methods may be employed to establish the separation between the beacon and the satellite. For example, the beacon may be positioned upon a spar projecting from the satellite.

It will be apparent that, if the time delay implicit in the prior art approach described above could be eliminated, the need for much of the hardware, possibly including the displaced beacon, could be avoided. Accordingly, it is a primary object of the present invention to compensate for atmospheric phase aberrations much more rapidly than is possible with conventional adaptive optics. Other objects are to eliminate much of the complexity required in conventional adaptive optics, and to substantially reduce or eliminate the need for spaced beacons and receivers associated with the satellite. Other objects, features, and advantages will become apparent from the following description and appended claims.

DISCLOSURE OF INVENTION

In accordance with the present invention, an orbiting beacon projects a ground directed laser signal at the Stokes-shifted Raman wavelength ($\lambda_R$). After passing through the atmosphere, the signal is phase-conjugated and amplified in a Raman amplifier, resulting in a high energy laser beam with phase-conjugated aberrations which is returned to the satellite by a telescope. If desired, information may be encoded thereon.

BEST MODE FOR CARRYING OUT THE INVENTION

Figure 1:
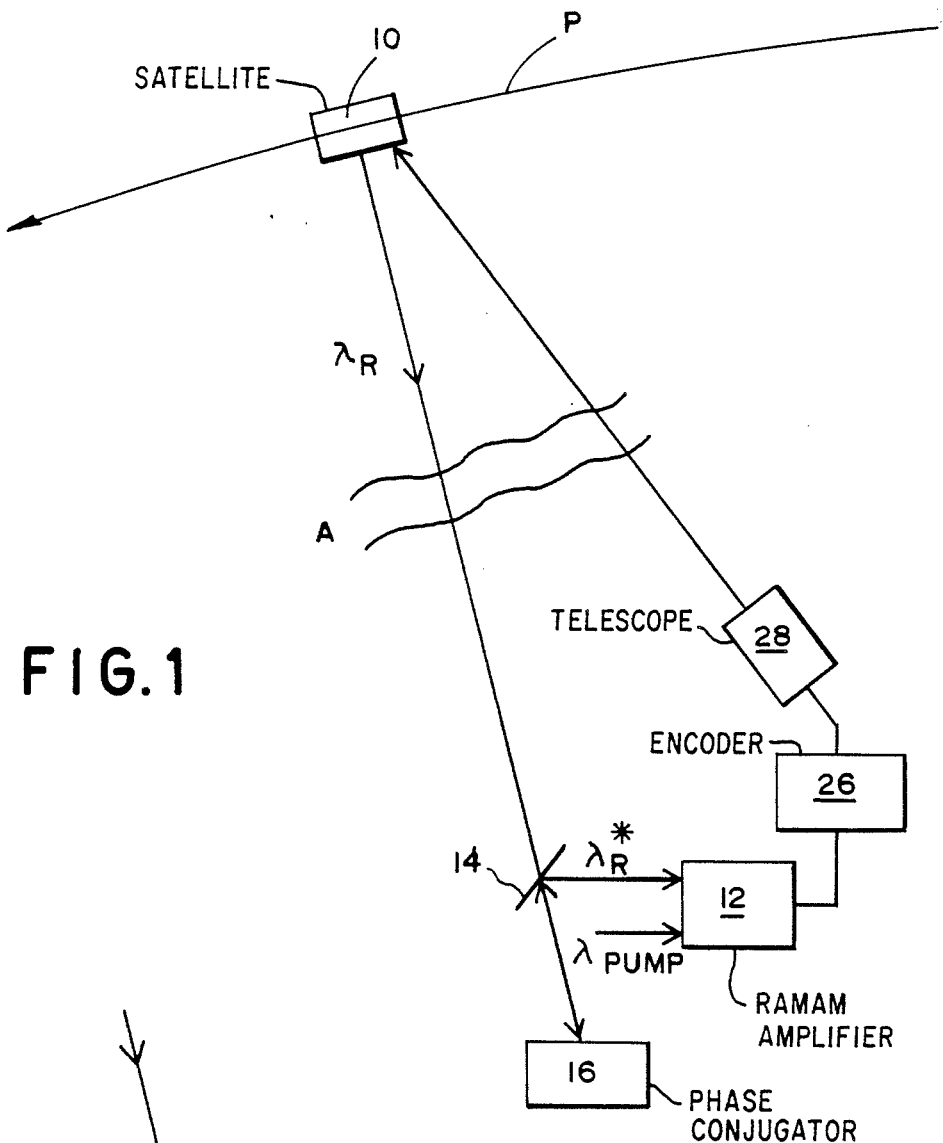
FIG. 1 is a diagram illustrating the operation of the invention.
Figure 2:
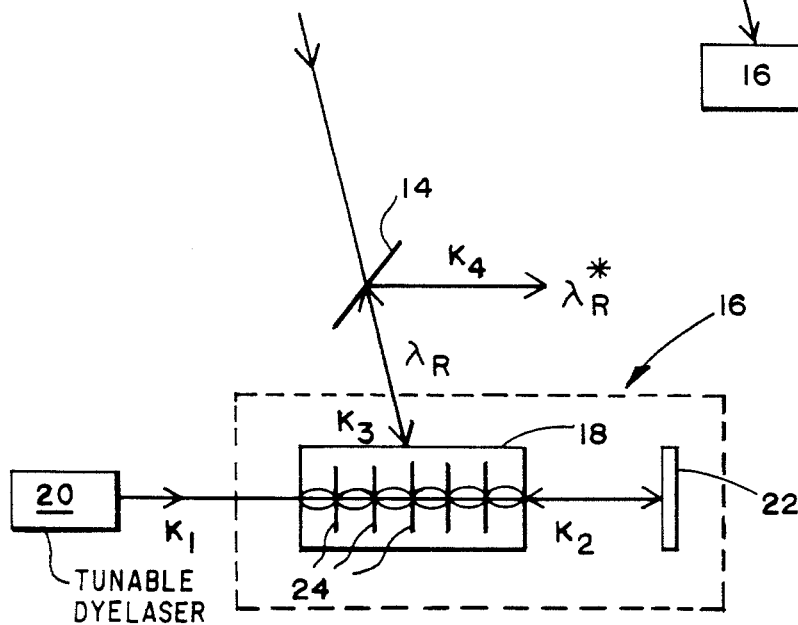
FIG. 2 is a diagram illustrating the phase conjugator portion of the invention.

With particular reference to FIG. 1, there is illustrated a satellite 10 following an orbital path P. In order to measure the aberrations produced by the atmosphere A, a signal from the satellite 10 to ground is required. The signal may be generated either by a laser beacon carried by the satellite or by reflection utilizing a ground based transmitter. For purposes of illustration and explanation, it is assumed that the beacon is carried by the satellite 10. The laser beacon transmits a Stokes-shifted Raman wavelength ($\lambda_R$) which exactly matches the vibrational or electronic states of a ground based Raman amplifier 12. A low power $\lambda_R$ wavefront is transmitted from the satellite 10 to the ground through the atmosphere A where it picks up atmospheric phase aberrations, as well as other optical aberrations. In the illustrated embodiment, it passes through a beam splitter 14 to a phase-conjugator 16. The signal is phase conjugated either by four wave mixing or by any other suitable technique. FIG. 2 illustrates a phase-conjugator 16 employing four wave mixing (identified by the vectors $K_1$–$K_4$). It comprises a non-linear crystal 18, such as ruby. ("Non-linear" refers to the fact that its index of refraction (n) is a function of the light intensity.) Crystal 18 is irradiated by a tunable dye laser 20. The radiation traverses the crystal 18 and is reflected by a mirror 22 back into the crystal. A standing wave is established within the crystal 18 having nodal planes 24 of similar refractive indices which function as a grating to return the phase-conjugate $\lambda_R^*$ of the received $\lambda_R$ radiation.

The phase-conjugated Raman wavefront $\lambda_R^*$ is then amplified in Raman amplifier 12 which is pumped at the same frequency. The amplified $\lambda_R^*$, which includes the conjugated phase aberrations, may now be used as the high energy laser beam for the upward link propagation to the satellite. If the upward link propagation is matched to the downward link propagation over the same line of sight, or stays within the atmospheric coherence length, the aberrations will cancel and a diffraction limited beam may be delivered to the target satellite through a telescope 28. Alternatively, a communication signal may be encoded onto the beam at an encoder 26 and the modulated signal returned to the satellite. If desired, the downlink and uplink propagating beams may be isolated by means of polarization techniques.

It will be noted that, by means of the present invention, all mechanical time delaying elements have been removed and the entire loop from satellite to ground and return can be closed at the speed of light. It will also be apparent that a number of variations and modifications may be made in this invention without departing from its spirit and scope. Accordingly, the foregoing description is to be construed as illustrative only, rather than limiting. This invention is limited only by the scope of the following claims.

What is claimed is:

1. The method of correcting an optical beam to be transmitted through an atmospheric path from a base location to a target for atmospheric and optical phase aberrations introduced by said path which comprises:
   providing a Raman amplifier at said base location;
   propagating an optical beam from said target to said base location at a Stokes shifted Raman wavelength which matches the vibrational state of the Raman amplifier medium;
   phase-conjugating the optical beam from said target at said base location;
   amplifying the phase-conjugated optical beam in said Raman amplifier; and
   redirecting the amplified phase-conjugated beam to said target through said atmospheric path.

2. The method of claim 1 wherein said optical beam is a laser beam.

3. The method of claim 1 wherein said phase-conjugating step comprises four wave mixing.

4. The method of claim 3 wherein said four wave mixing step comprises:
   pumping a non-linear crystal with a low power laser at said Stokes shifted Raman wavelength to establish a standing wave nodal pattern therein capable of functioning as an optical grating; and
   directing said optical beam into said crystal whereby said optical beam is phase-conjugated.

5. The method of claim 1 wherein said optical beam originates at said target.

6. The method of claim 1 wherein said optical beam is reflected from said target.

7. The method of claim 2 wherein said phase-conjugating step comprises four wave mixing.

8. The method of claim 7 wherein said four wave mixing step comprises:
   pumping a non-linear crystal with a low power laser at said Stokes shifted Raman wavelength to establish a standing wave nodal pattern therein capable of functioning as an optical grating; and
   directing said optical beam into said crystal whereby said optical beam is phase-conjugated.

9. The method of claim 8 wherein said optical beam originates at said target.

10. The method of claim 8 wherein said optical beam is reflected from said target.

11. Appratus for correcting an optical beam transmitted through an atmospheric path from a base location to a target for atmospheric and optical phase aberrations introduced by said path which comprises:
    a Raman amplifier at said base location;
    means for propagating an optical beam from said target to said base location at a Stokes shifted Raman wavelength which matches the vibrational state of the Raman amplifier medium;
    means at said base location for phase-conjugating the optical beam from said target and directing the phase-conjugated optical beam to said Raman amplifier; and
    means for redirecting the amplified phase-conjugated beam from said Raman amplifier to said target through said atmospheric path.

12. The apparatus of claim 11 wherein said propagating means is a laser.

13. The apparatus of claim 11 wherein said phase conjugating means comprises:
    a non-linear crystal;
    means for pumping said non-linear crystal with a low power laser at said Stokes shifted Raman wavelength to establish a standing wave nodal pattern therein capable of functioning as an optical grating; and
    means for directing said optical beam into said crystal whereby said optical beam is phase-conjugated.

* * * * *

UNITED STATES PATENT AND TRADEMARK OFFICE
CERTIFICATE OF CORRECTION

PATENT NO. : 4,949,056

DATED : August 14, 1990

INVENTOR(S) : Prasad Akkapeddi

It is certified that error appears in the above-identified patent and that said Letters Patent is hereby corrected as shown below:

Amend Claims 1, 4, 11 and 13 as follows:

Col. 3,
1. The method of correcting an optical beam to be transmitted through an atmospheric path from a base location to a target for atmospheric and optical phase aberrations introduced by said path which comprises:

Providing a Raman amplifier at said base location; propagating an optical beam from said target to said base location at a Stokes shifted Raman wavelength which matches the vibrational state of the Raman amplifier medium; phase-conjugating by four wave-mixing of the optical beam from said target at said base location;

amplifying the phase-conjugated optical beam in said Raman amplifier; and redirecting the amplified phase-conjugated beam to said target through said atmospheric path.

4. The method of claim 1 wherein said four said four wave-mixing step comprises:

pumping a non-linear crystal with a low power laser at said Stokes shifted Raman wavelength to establish a standing wave nodal pattern therein capable of functioning as an optical grating; and directing said optical beam into said crystal whereby said optical beam is phase-conjugated.

UNITED STATES PATENT AND TRADEMARK OFFICE
CERTIFICATE OF CORRECTION

PATENT NO. : 4,949,056
DATED : August 14, 1990
INVENTOR(S) : Prasad Akkapeddi

It is certified that error appears in the above-identified patent and that said Letters Patent is hereby corrected as shown below: Col. 4, 11. Apparatus for correcting an optical beam transmitted through an atmospheric path from a base location to a target for atmospheric and optical phase aberrations introduced by said path which comprises:

a Raman amplifier at said base location; means for propagating an optical beam from said target to said base location at a Stokes shifted Raman wavelength which matches the vibrational state of the Raman amplifier medium;

four wave-mixing means at said base location for phase-conjugating the optical beam from said target and directing the phase-conjugated optical beam to said Raman amplifier; and means for redirecting the amplified phase-conjugated beam from said Raman amplifier to said target through said atmospheric path.

13. The apparatus of Claim 11 wherein said four wave-mixing means comprises:

a non-linear crystal;

UNITED STATES PATENT AND TRADEMARK OFFICE
CERTIFICATE OF CORRECTION

PATENT NO. : 4,949,056

DATED : August 14, 1990

INVENTOR(S) : Prasad Akkapeddi

It is certified that error appears in the above-identified patent and that said Letters Patent is hereby corrected as shown below:

means for pumping said non-linear crystal with a low power laser at said Stokes shifted Raman wavelength to establish a standing wave nodal pattern therein capable for functioning as an optical grating; and means for directing said optical beam into said crystal whereby said optical beam is phase-conjugated.

Signed and Sealed this

Thirteenth Day of October, 1992

Attest:

DOUGLAS B. COMER

Attesting Officer

Acting Commissioner of Patents and Trademarks